March 8, 1932.  A. TROSCH  1,848,915
MACHINE TOOL
Filed April 4, 1928   5 Sheets-Sheet 1

INVENTOR
Alfred Trosch
BY Harold E. Stonebraker
his ATTORNEYS

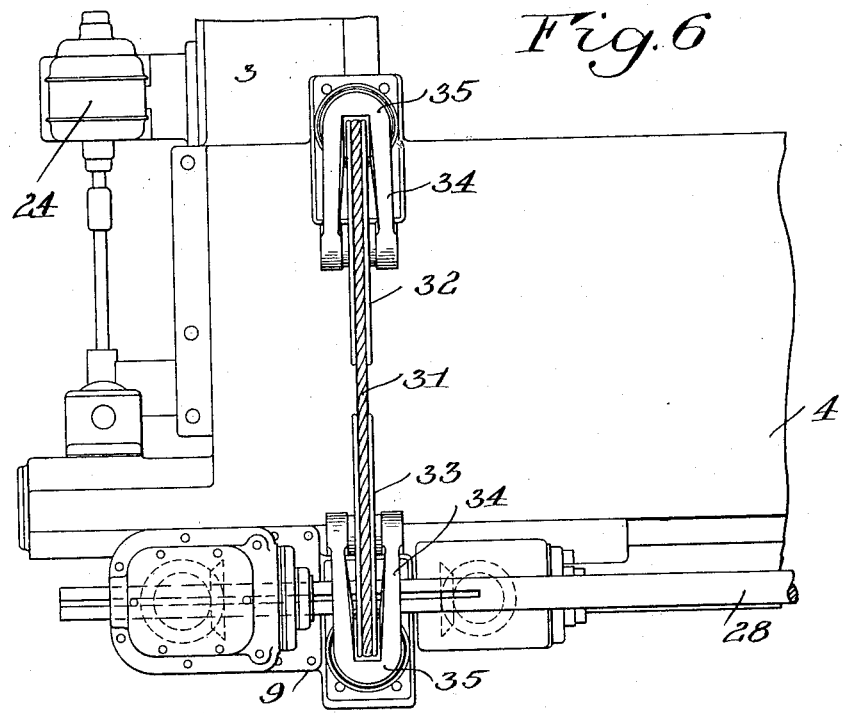
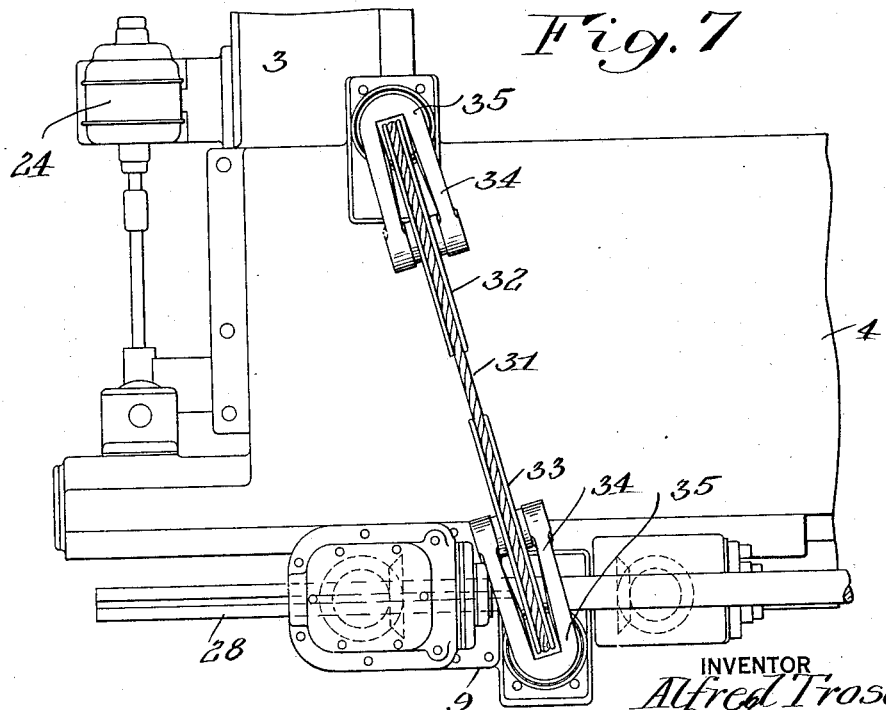

Patented Mar. 8, 1932

1,848,915

UNITED STATES PATENT OFFICE

ALFRED TROSCH, OF ROCHESTER, NEW YORK, ASSIGNOR TO CONSOLIDATED MACHINE TOOL CORPORATION OF AMERICA, OF ROCHESTER, NEW YORK, A CORPORATION OF DELAWARE

MACHINE TOOL

Application filed April 4, 1928. Serial No. 267,284.

My invention relates to a machine tool, with special reference to milling machines of the type involving vertically arranged tool head supporting rails adjustable toward or from a work table so as to reduce as far as possible overhang of the cutter spindles, and it is a purpose of my invention to afford a practicable and rugged structure in which the vertical tool head supporting rails are rigidly held although they can be easily moved to any adjusted position in an accurate and reliable way.

In a more particular aspect, the invention is intended to afford a structure that will hold the vertical tool head supporting rails firmly, while insuring uniform movements of the top and bottom portions of the rails by mechanism that prevents binding and compels proper positioning of both the tops and bottoms of the vertical rails on their supporting structure during lateral movement of the rails.

Another purpose of the invention is to so mount laterally adjustable vertical rails on which tool heads are supported and to move the rails in and out by such mechanism that the cutter spindles carried on the rails are firmly mounted, reducing chatter of the tools, and increasing the efficiency, durability and production possibilities of the machine.

To these and other ends the invention comprises the construction and arrangement of parts that will appear from the following description when read in conjunction with the accompanying drawings, the novel features being pointed out in the claims following the description.

In the drawings:

Figure 6 is a partial plan view illustrating the counterbalancing mechanism for one of the vertical side rails, and showing the latter in its outer position, and Figure 7 is a similar view showing the vertical side rail adjusted inwardly toward the bed and table.

Figure 1:
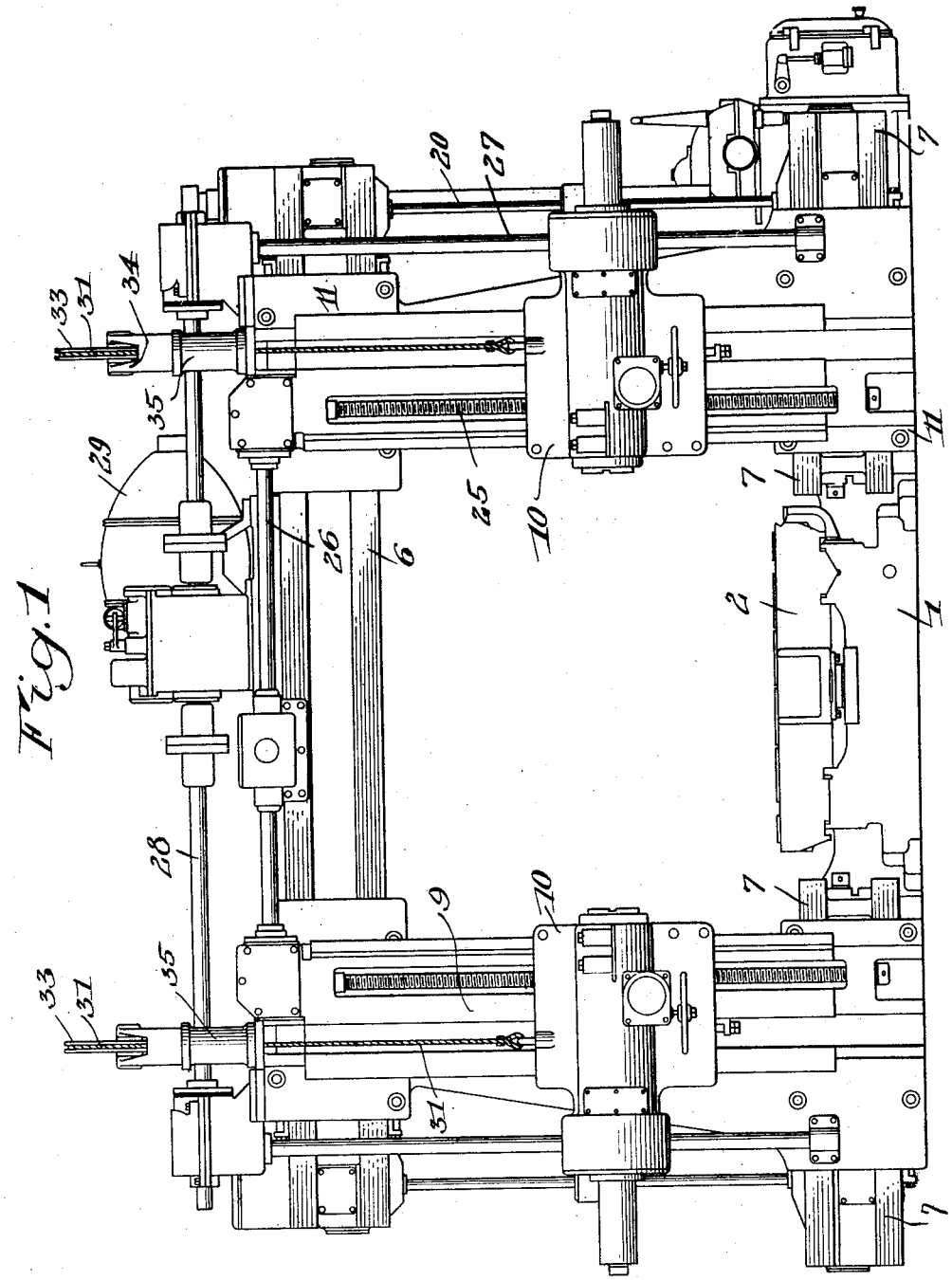
Figure 1 is an end elevation of a milling machine built in accordance with a preferred embodiment of the invention.

Referring more particularly to the drawings, in which like reference characters refer to corresponding parts throughout the several views, 1 designates the stationary bed upon which is mounted the reciprocating table 2, while 3 designates upright columns tied to the bed and connected at the top by the cross-head 4, the bed, columns and cross-head together constituting a fixed supporting structure for the side rails on which the tool heads are mounted, as will now be described.

The cross-head 4 is provided with horizontal guideways 6, while 7 designate horizontal guideways arranged at the bottoms of the upright columns on opposite sides of the bed and table. Movable on the guideways 6 and 7 are vertically arranged side rails 9 upon which are arranged for vertical travel the tool heads 10. Since the construction and operation of the two vertical side rails are substantially the same, for convenience only one of these will be described.

Figure 2:
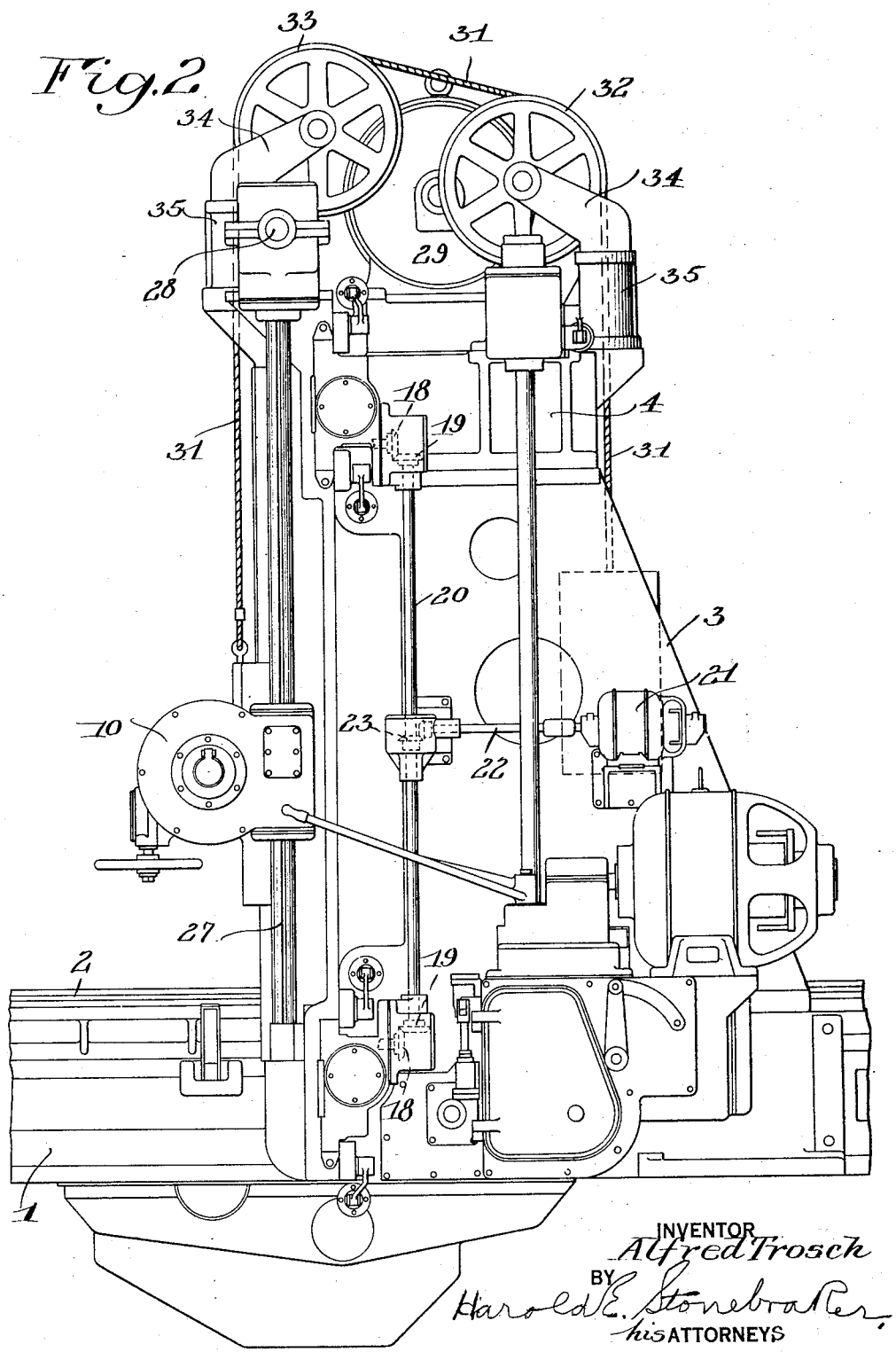
Figure 2 is a side elevation of the same.
Figure 3:
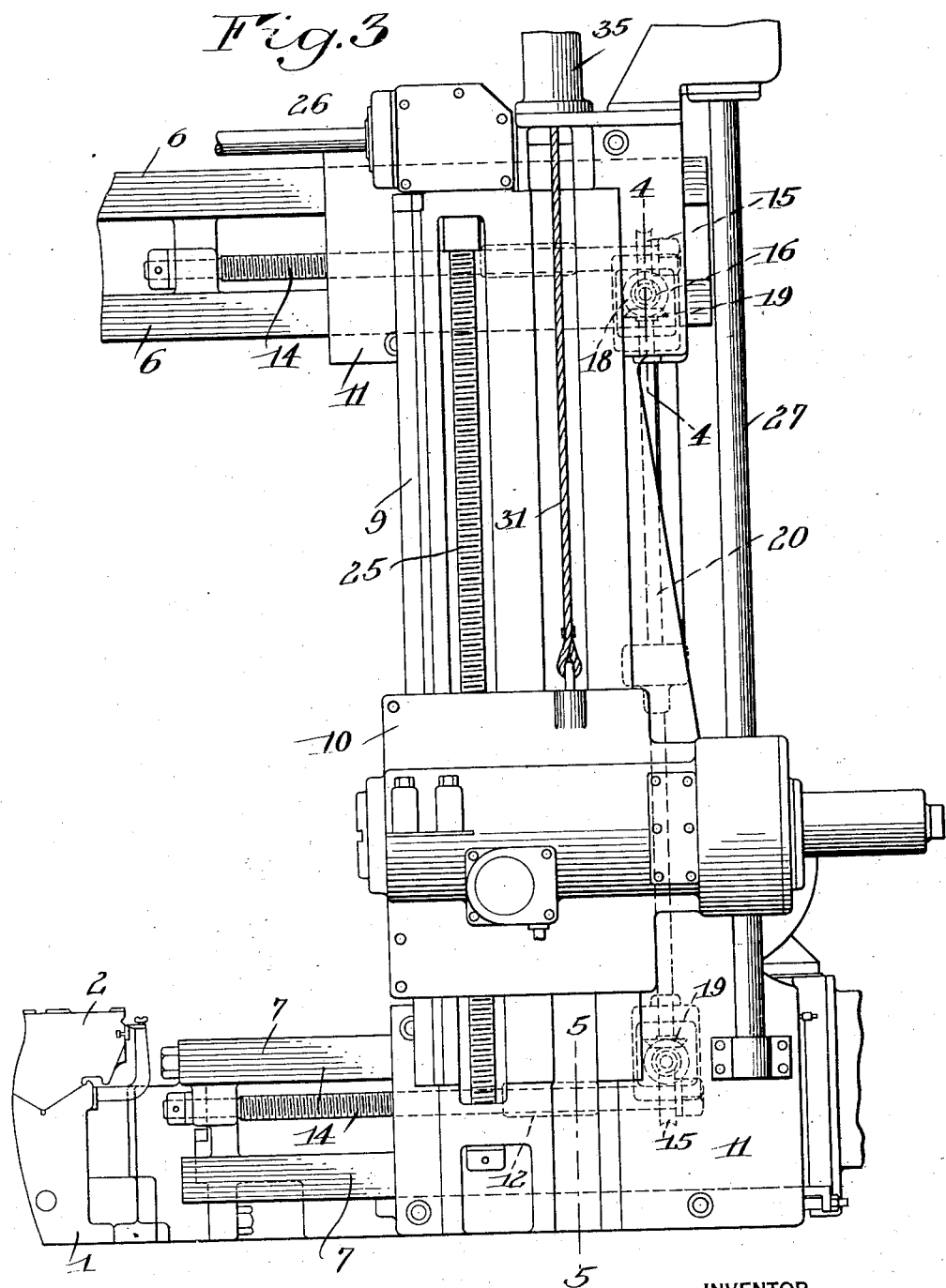
Figure 3 is an enlarged end view with parts broken away, showing one of the vertically arranged side rails adjusted outwardly from the bed and table.
Figure 4:
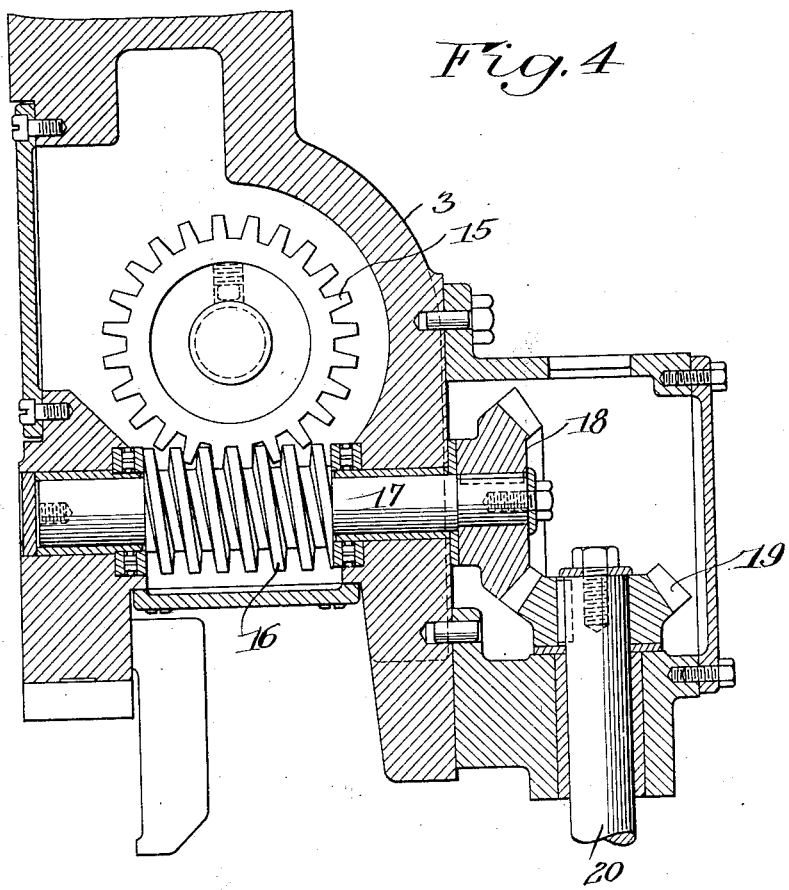
Figure 4 is an enlarged detail sectional view on line 4—4 of Figure 3.
Figure 5:
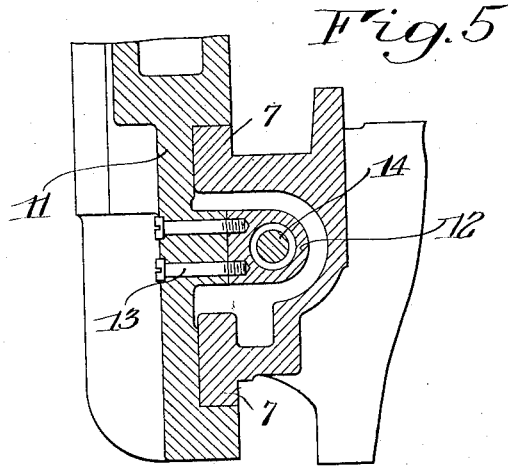
Figure 5 is an enlarged detail sectional view on line 5—5 of Figure 3.

The side rail 9 includes suitable guide plates 11 that overhang and travel on the guideways 6 and 7, while 12 designate nuts secured to the side rails by bolts 13 and engaging the rotary operating screws 14, one of which is mounted between each pair of guideways at the tops and bottoms of the rails, as shown in Figure 3. The operating screws 14 each form part of a shaft carrying a worm gear 15, see Figure 4, operated by a worm 16 on a shaft 17 which carries a bevel pinion 18. The latter is in turn operated by a bevel pinion 19 on a shaft 20, see Figures 2 and 4, which is driven from the motor 21 through shaft 22 and bevel pinions 23.

Motor 21 serves to drive the top and bottom operating screws 14 for the side rail 9 on one side of the machine while motor 24, see Figure 6, operates the top and bottom screws for the side rail on the other side of the machine, the driving mechanism being similar to that just set forth in detail. By this means, the side rails can be adjusted independently of each other. In order to move one or the other of the tool head supporting side rails to the right or left, so as to bring its tool closer to or at a point more remote from the work on the table, the motor to the particular side rail is operated, causing simultaneous turning of the corresponding screws 14 and simultaneous and equal movement of the top and bottom of the side rail.

The tool head 10 is movable vertically on its side rail by means of the feed screw 25 that is operated through suitable gearing from a horizontal shaft 26, driven from any suitable source and serving to control both of the feed screws 25. The tool spindles in the tool heads 10 are operated from vertical shafts 27 that are driven from a horizontal power shaft 28 on top of the cross-head, the same being driven from motor 29 through suitable transmission gearing.

By the construction described, it is possible to readily control the position of the side rails and to adjust them to any desired position accurately, imparting equal movements to the top and bottom portions and also holding the rail firmly and rigidly in position when once adjusted, thereby securing a tool head and tool spindle firmly in proper relation to the work, all of which reduces possibility of chatter in the machine, increases its efficiency, and gives greater production.

Each tool head is connected to a counterweight, as usual in this general type of machinery, by a cable 31 which is guided by pulleys 32 mounted on the cross-head and pulleys 33 mounted at the upper end of the side rail. In order to compensate for the change in position of the parts of the cable 31 caused by shifting of the side rail, as shown in Figures 6 and 7, the pulleys 32 and 33 are mounted in yokes 34 carried by posts 35 which are pivotally arranged in suitable supports to permit turning of the posts and of the yokes. With this mechanism, as the side rail is moved inwardly from its outermost position, the top and front strands of the cable 31 readily shift by turning of the posts 35 and thus adjust themselves to the changed relation between the cross-head of the stationary supporting structure and the laterally movable side rail.

While the invention has been described with reference to a certain detailed arrangement of parts, it may be modified in various respects and this application is intended to cover such changes or other adaptations as come within the intended purposes of the improvement or the scope of the following claims.

I claim:

1. In a machine tool, the combination with a horizontal bed, a table slidable on the bed, upright columns fixed to the bed on opposite sides of the table, of a cross-head rigidly connecting said columns at the top above and over the table, horizontal guideways on said cross-head, horizontal guideways on the bed at the bottoms of the columns and on opposite sides of the table, vertically arranged side rails each mounted in top and bottom guideways and movable toward and from the table, devices cooperating with each side rail at both its top and bottom for imparting equal movements thereto along the top and bottom guideways, means for actuating said devices at the tops and bottoms of each side rail simultaneously, and revoluble tool heads carried by said side rails.

2. In a machine tool, the combination with a horizontal bed, a table thereon, upright columns fixed to the bed on opposite sides of the table, of a cross-head rigidly connecting said columns at the top forming therewith a frame over and above the table, horizontal guideways on said cross-head, operating screws between said guideways, horizontal guideways on the bed at the bottoms of the columns and on opposite sides of the table, operating screws between said guideways on the bed, vertically arranged side rails movably mounted in said top and bottom guideways, nuts carried by the side rails at the tops and bottoms thereof and engaging said operating screws, means for operating the top and bottom screws of a side rail simultaneously, and revoluble tool heads carried by said side rails.

3. In a machine tool, the combination with a horizontal bed, a table thereon, upright columns fixed to the bed on opposite sides of the table, of a cross-head rigidly connecting said columns at the top and forming therewith a frame over and above the table, horizontal guideways on said cross-head, operating screws between said guideways, horizontal guideways on the bed at the bottoms of the columns and on opposite sides of the table, operating screws between said guideways on the bed, vertically arranged side rails movably mounted in said top and bottom guideways, nuts carried by the side rails at the tops and bottoms thereof and engaging said operating screws, means for operating the top and bottom screws of a side rail simultaneously, a vertically movable tool head revolubly mounted in each of said side rails, and power actuated means for moving said tool heads simultaneously.

4. In a machine tool, the combination with a horizontal bed, a table slidable on the bed, upright columns fixed to the bed on opposite sides of the table, of a cross-head rigidly connecting said columns at the top above and over the table, horizontal guideways on said cross-head, horizontal guideways on the bed at the bottoms of the columns and on opposite sides of the table, vertically arranged side rails each mounted in top and bottom guideways and movable toward and from the table, devices cooperating with each side rail at both its top and bottom for imparting equal movements thereto along the top and bottom guideways, means for actuating said devices at the tops and bottoms of each side rail simultaneously, revoluble tool heads movable vertically on said side rails, a counterweight arranged on each of said upright columns, a cable connecting each of said counterweights with one of said vertically movable tool heads, a guide pulley for one of said cables on each of said upright columns, a second guide pulley on each of said side rails for the corresponding cable, and pivotally mounted supports for said pulleys permitting the axes of the pulleys to retain a position of relative parallelism when the vertical side rails are moved on their horizontal guideways.

In witness whereof, I have hereunto signed my name.

ALFRED TROSCH.